US 12,202,434 B2

(12) United States Patent
Nakagawa (10) Patent No.: US 12,202,434 B2
(45) Date of Patent: Jan. 21, 2025

(54) VEHICLE AND METHOD FOR GRANTING ACCESS TO VEHICLE FUNCTIONALITIES

(71) Applicant: TOYOTA MOTOR NORTH AMERICA, INC., Plano, TX (US)

(72) Inventor: Masashi Nakagawa, Sunnyvale, CA (US)

(73) Assignee: Toyota Motor North America, Inc., Plano, TX (US)

(*) Notice: Subject to any disclaimer, the term of this patent is extended or adjusted under 35 U.S.C. 154(b) by 625 days.

(21) Appl. No.: 17/188,515

(22) Filed: Mar. 1, 2021

(65) Prior Publication Data

US 2022/0274552 A1    Sep. 1, 2022

(51) Int. Cl.
  *B60R 25/24*    (2013.01)
  *B60R 16/037*   (2006.01)
  *B60R 25/34*    (2013.01)
  *H04M 1/72412*  (2021.01)

(52) U.S. Cl.
  CPC .......... *B60R 25/241* (2013.01); *B60R 16/037* (2013.01); *B60R 25/34* (2013.01); *H04M 1/72412* (2021.01)

(58) Field of Classification Search
  CPC ..... B60R 25/241; B60R 16/037; B60R 25/34; H04M 1/72412; H04M 1/724098; H04M 2250/02
  See application file for complete search history.

(56) References Cited

U.S. PATENT DOCUMENTS

| | | | |
|---|---|---|---|
| 10,137,848 B2 | 11/2018 | Decia et al. | |
| 10,542,383 B2 | 1/2020 | Santavicca et al. | |
| 11,258,598 B2* | 2/2022 | Yang | H04L 9/0866 |
| 11,349,187 B1* | 5/2022 | Statezni | H04W 4/023 |
| 2013/0099892 A1* | 4/2013 | Tucker | H04L 9/08 340/5.61 |
| 2013/0332007 A1* | 12/2013 | Louboutin | H04M 1/724098 701/1 |
| 2015/0210287 A1* | 7/2015 | Penilla | B60W 40/08 701/49 |
| 2015/0262441 A1* | 9/2015 | Kim | B60R 25/24 340/5.6 |
| 2016/0358389 A1 | 12/2016 | Menard et al. | |
| 2017/0187863 A1* | 6/2017 | Chen | H04L 67/306 |
| 2017/0253216 A1* | 9/2017 | Nishidai | H04M 1/72412 |
| 2017/0308817 A1 | 10/2017 | Miller | |
| 2017/0345241 A1* | 11/2017 | Santavicca | H04W 4/80 |
| 2018/0154865 A1 | 6/2018 | Bianchi et al. | |

(Continued)

FOREIGN PATENT DOCUMENTS

WO    2016068539 A1    5/2016

*Primary Examiner* — Jelani A Smith
*Assistant Examiner* — Alyssa Rorie
(74) *Attorney, Agent, or Firm* — Dinsmore & Shohl LLP (57) ABSTRACT

A method for granting access to vehicle functionalities is provided. The method includes receiving a signal from a device that is external to the vehicle, the signal including identification data of an object associated with the device, comparing the identification data with user identifications stored in the memory of the vehicle, and granting, to the object, access to a first set of functionalities of the vehicle in response to determining that the identification data matches a first user identification of the user identifications stored in the memory of the vehicle.

20 Claims, 5 Drawing Sheets

(56) References Cited

U.S. PATENT DOCUMENTS

| | | | |
|---|---|---|---|
| 2018/0257605 A1* | 9/2018 | Oberbeckmann | B60R 25/245 |
| 2018/0357846 A1* | 12/2018 | Chen | B60R 25/241 |
| 2019/0054899 A1* | 2/2019 | Hoyos | H04L 63/0861 |
| 2021/0021999 A1* | 1/2021 | Ramic | H04W 12/06 |
| 2021/0122330 A1* | 4/2021 | Sung | B60R 25/305 |
| 2021/0221330 A1* | 7/2021 | Boudet | G07C 9/00309 |
| 2021/0250355 A1* | 8/2021 | Galdo | G06F 21/335 |
| 2021/0253119 A1* | 8/2021 | Lerzer | B60R 16/037 |

* cited by examiner

VEHICLE AND METHOD FOR GRANTING ACCESS TO VEHICLE FUNCTIONALITIES

TECHNICAL FIELD

The embodiments described herein generally relate to granting access to functionalities of vehicles, and more specifically, to generating access to different sets of vehicle functionalities to different users based on various conditions.

BACKGROUND

Conventional vehicle systems enable users to sync and pair their mobile devices with processors onboard vehicles such that the user may view in-vehicle infotainment, playback on the head unit of the IV system, and so forth. However, conventional vehicles lack the functionality to grant access different levels of access to functionalities of a vehicle to various users.

Accordingly, a need exists for enabling users that not associated with a particular vehicle (e.g., users that are not vehicle owners) to access different sets of vehicle functionalities upon correct identification and authentication of the users' identities.

SUMMARY

In one embodiment, a device configured to grant access to one or more functionalities of a vehicle is provided. The device may be a vehicle comprising memory storing user identifications including a first user identification and a second user identification, the first user identification being associated with a first set of functionalities and the second user identification being associated with a second set of functionalities. Additionally, the vehicle may include a processor that is configured to receive a signal from a device that is external to the vehicle, the signal including identification data of an object associated with the device, compare the identification data with the user identifications stored in the memory of the vehicle, and grant, to the object, access to the first set of functionalities of the vehicle in response to determining that the identification data matches the first user identification.

In another embodiment, a method of granting access to one or more functionalities of a vehicle is provided. The method implemented by a processor of a vehicle, the method includes receiving a signal from a device that is external to the vehicle, the signal including identification data of an object associated with the device, comparing the identification data with the user identifications stored in the memory of the vehicle, and granting, to the object, access to the first set of functionalities of the vehicle in response to determining that the identification data matches the first user identification.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein describe a method and system for granting access to various sets or levels of vehicle functionalities to different users based on verifying the identities of these users. As stated above, conventional vehicle systems may be paired or synced with mobile devices of these users such that these users (e.g., owners of vehicles) have access to various aspects of the vehicle, e.g., in-vehicle infotainment, playback on the head unit of the IV system, and so forth.

Unlike conventional systems, however, the functionality access granting system described herein enables vehicle systems to leverage the functionalities of various vehicles and grants access to different sets of vehicle functionalities to different users (e.g., users that are not owners of the vehicle) upon correct identification and authentication of the users' identities. In embodiments, the functionality access granting system may include a vehicle with an onboard processor that receives a Bluetooth® signal from a user's mobile device (e.g., a smartphone), extracts and analyzes the identification data included in the signal, compares the identification data with a list of user identifications stored in memory of the vehicle (and/or as part of cloud server), and grant access to specific set of functionalities of the vehicle in response to determining that the identification data of the user matches a particular user identification stored in the memory of the vehicle and/or a server. As described in detail in this disclosure, upon the matching of the user's identification data with one or more user identifications stored in memory, a processor of the vehicle may unlock the doors of the vehicle, and enable the user to control the air conditioning, access the audio system of the vehicle (e.g., radio, CD/DVD, and so forth), control seat warmers, and so forth.

Figure 1:
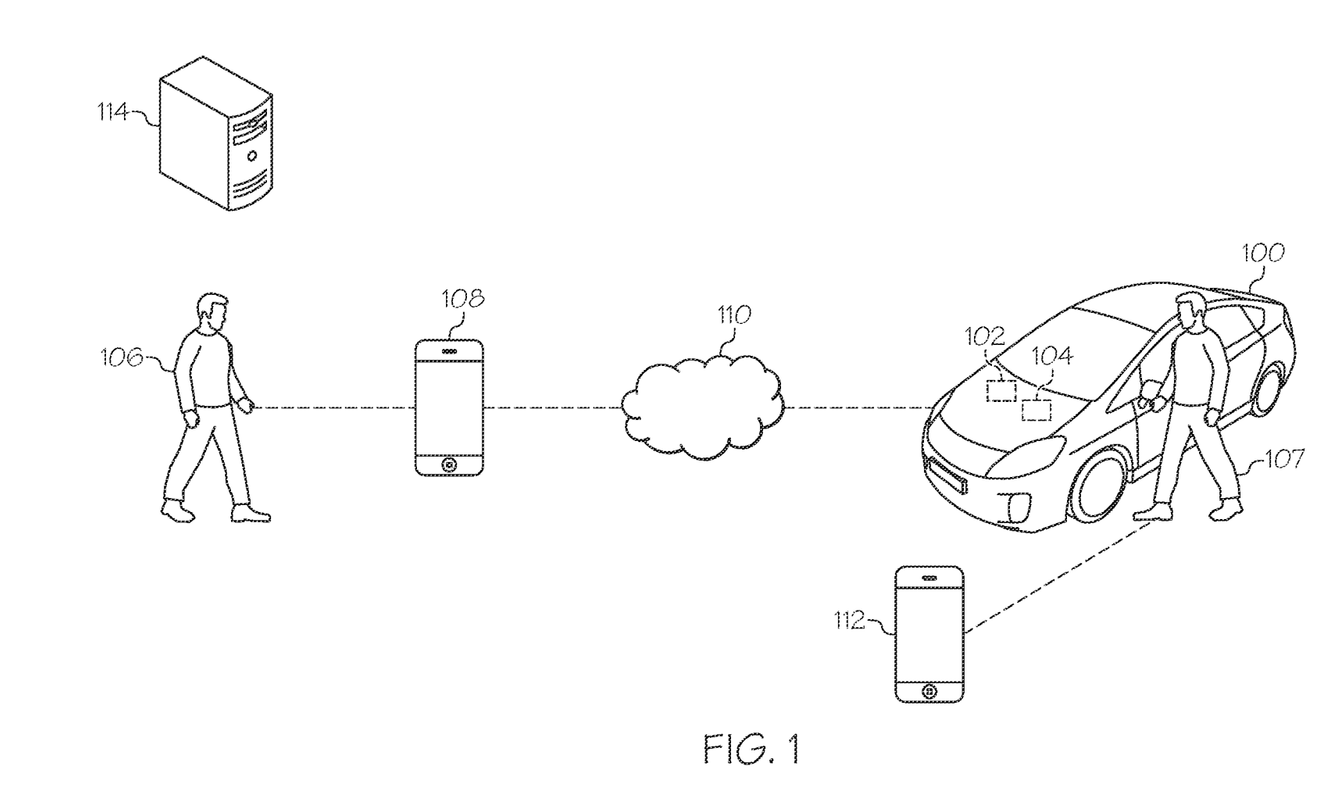
FIG. 1 schematically depicts an example operating environment of a functionality access granting system of the present disclosure, according to one or more embodiments described and illustrated herein.

Referring now to the drawings, FIG. 1 schematically depicts an example operating environment of a functionality access granting system of the present disclosure, according to one or more embodiments described and illustrated herein. As illustrated, FIG. 1 depicts a vehicle 100 that may be, e.g., parked at a particular location such as a parking lot. In an example operating environment of the functionality access granting system of the present disclosure, an example user 107, carrying an example mobile device 112, may approach the vehicle 100. When the example user 107 is within a certain proximity of the vehicle 100, the mobile device 112 may transmit a Bluetooth® signal, automatically and without user intervention, to the vehicle 100. The received Bluetooth® signal may be analyzed by one or more processors of the vehicle 100. In embodiments, the processing may include comparing identification data of the example user 107 and/or the mobile device 112 associated with the example user 107 that is included in the Bluetooth® signal with a plurality of user identification data stored in memory of the vehicle. Alternatively or additionally, the vehicle 100 may communicate with the server 114, via communication network 110, and access one or more user identifications stored as part of, e.g., a cloud server online.

Thereafter, if the one or more processors of the vehicle determines that the identification data included as part of the received Bluetooth® signal matches a particular user identification stored in memory of the vehicle 100 and/or the server 114, the processor may determine that the example user 107 and his associated mobile device 112 has an identity that matches that of the user whose user identification is stored in memory of the vehicle 100 and/or the server 114, and as such, the one or more processors may grant the example user 107 a specific designated set of vehicle functionalities of the vehicle 100. For example, based on confirming the identity of the example user 107, the one or more processors of the vehicle 100 may automatically unlock the passenger side and/or driver side doors of the vehicle 100, and enable the user 107 to access the air conditioning control system 102 (e.g., components that control air conditioning within the vehicle 100), the component temperature control system 104 (e.g., components that control seat warmers (and/or other components) within the vehicle 100), and so forth. It is noted that the functionality access granting system described herein may also grant the example user 107 access to a variety of other vehicle functionalities, e.g., audio system, display systems, and so forth.

Additionally, in embodiments, one or more notifications may be transmitted, automatically and without user intervention, by the vehicle 100 to the mobile device 108 of the vehicle owner 106 via the communication network 110. It is noted that such a notification may also be transmitted, manually and/or automatically and without user intervention, to other devices associated with the vehicle owner 106.

In some embodiments, different users may have access to varying set of vehicle functionalities. For example, a first user may have access only to the air conditioning system and the audio system of the vehicle 100, while a second user may have access to the air conditioning system, the audio system, and the seat warming components of the vehicle 100. Furthermore, based on the discretion and input of the vehicle owner 106, the functionalities designated for the first user and the second user may be updated in real time, e.g., via the vehicle owner 106 interacting with a software application accessible via the mobile device 108 (or a variety of other devices). In some embodiments, an individual may transmit a request to the mobile device 108 of the vehicle owner 106 to access a certain set of vehicle functionalities, and the vehicle owner 106 may, in real time, update the user identifications stored in memory of the vehicle 100 or the server 114 to include one or more functionalities such that the requesting user may be granted, in real time, a certain set of vehicle functionalities.

Figure 2:
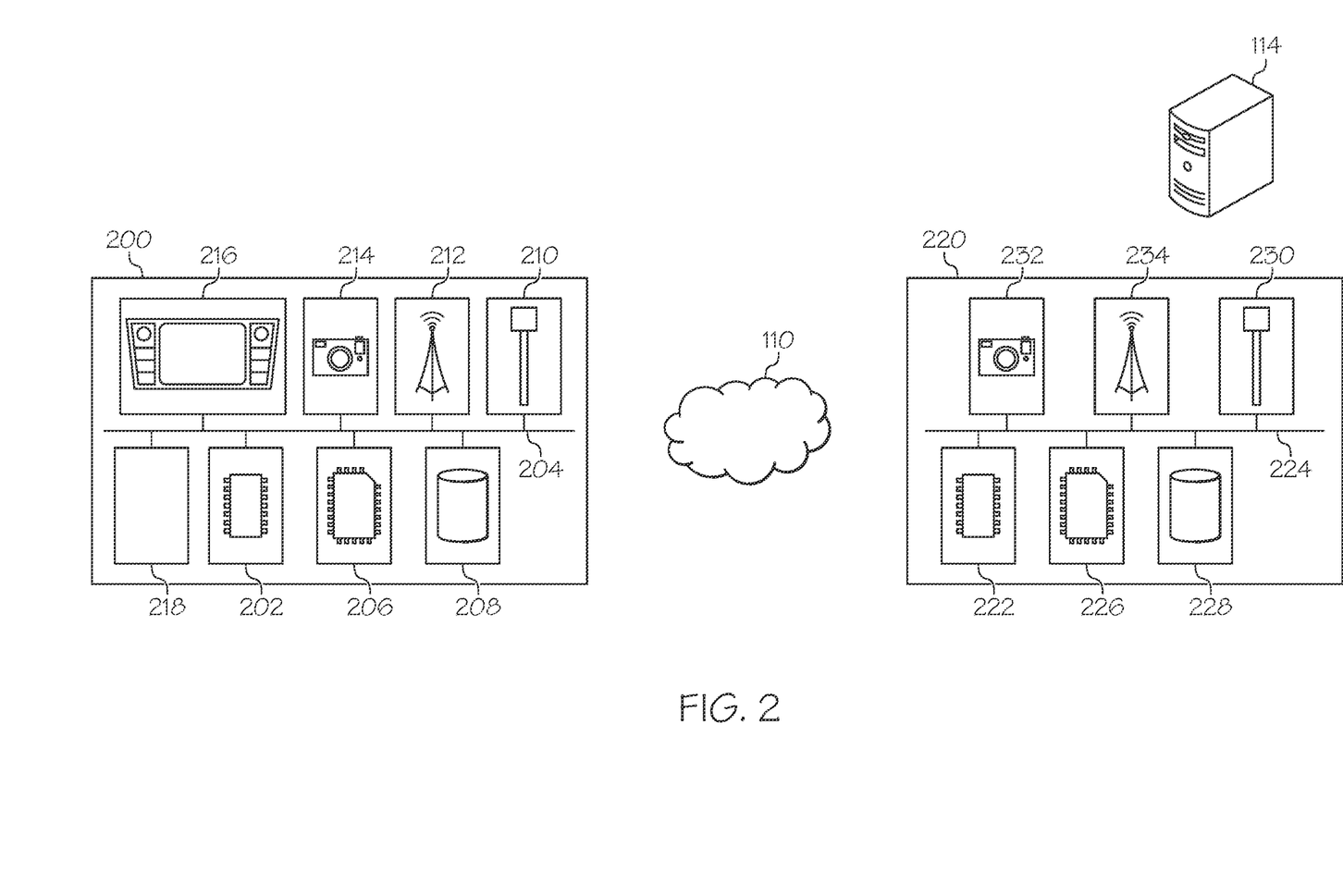
FIG. 2 schematically depicts non-limiting components of the vehicles and the devices of the present disclosure, according to one or more embodiments described and illustrated herein.

FIG. 2 schematically depicts non-limiting components of the vehicles and the devices of the present disclosure, according to one or more embodiments described and illustrated herein.

FIG. 2 schematically depicts non-limiting components of a vehicle system 200 and a mobile device system 220, according to one or more embodiments shown herein. Notably, while the vehicle system 200 is depicted in isolation in FIG. 2, the vehicle system 200 may be included within a vehicle. For example, the vehicle system 200 may be included within the vehicle 100. The vehicle 100 may be an automobile or any other passenger or non-passenger vehicle such as, for example, a terrestrial, aquatic, and/or airborne vehicle. In some embodiments, these vehicles may be autonomous vehicles that navigate their environments with limited human input or without human input.

The vehicle system 200 and the mobile device system 220 may include processors 202 and 222. As stated, the vehicle system 200 may be included within the vehicle 100 and the mobile device system 220 may be included within the mobile devices 108, 112. The processors 202, 222 may be any device capable of executing machine readable and executable instructions. Accordingly, the processors 202, 222 may be a controller, an integrated circuit, a microchip, a computer, or any other computing device.

The processors 202, 222 may be coupled to communication paths 204, 224, respectively, that provide signal interconnectivity between various modules of the vehicle system 200 and mobile device system 220. Accordingly, the communication paths 204, 224 may communicatively couple any number of processors (e.g., comparable to the processors 202, 222) with one another, and allow the modules coupled to the communication paths 204, 224 to operate in a distributed computing environment. Specifically, each of the modules may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication paths 204, 224 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication paths 204, 224 may be formed from a combination of mediums capable of transmitting signals. In one embodiment, the communication paths 204, 224 comprises a combination of conductive traces, conductive wires, connectors, and buses that cooperate to permit the transmission of electrical data signals to components such as processors, memories, sensors, input devices, output devices, and communication devices. Accordingly, the communication paths 204, 224 may comprise a vehicle bus, such as for example a LIN bus, a CAN bus, a. VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 and the mobile device system 220 include one or more memory modules 206, 226 respectively, which are coupled to the communication paths 204, 224. The one or more memory modules 206, 226 may comprise RAM, ROM, flash memories, hard drives, or any device capable of storing machine readable and executable instructions such that the machine readable and executable instructions can be accessed by the processors 202, 222. The machine readable and executable instructions may comprise logic or algorithm(s) written in any programming language of any generation (e.g., 1GL, 2GL, 3GL, 4GL, or 5GL) such as, for example, machine language that may be directly executed by the processors 202, 222 or assembly language, object-oriented programming (OOP), scripting languages, microcode, etc., that may be compiled or assembled into machine readable and executable instructions and stored on the one or more memory modules 206, 226. Alternatively, the machine readable and executable instructions may be written in a hardware description language (HDL), such as logic implemented via either a Meld-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 206, 226 may store data related to status and operating condition information related to one or more vehicle components, e.g., brakes, airbags, cruise control, electric power steering, battery condition, and so forth.

The vehicle system 200 and the mobile device system 220 may include one or more sensors 208, 228. Each of the one or more sensors 208, 228 is coupled to the communication paths 204, 224 and communicatively coupled to the processors 202, 222. The one or more sensors 208 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the vehicle system 200 and the mobile device system 220 optionally includes satellite antennas 210, 230 coupled to the communication paths 204, 224 such that the communication paths 204, 224 communicatively couple the satellite antennas 210, 230 to other modules of the mobile device system 220. The satellite antennas 210, 230 are configured to receive signals from global positioning system satellites. Specifically, in one embodiment, the satellite antennas 210, 230 include one or more conductive elements that interact with electromagnetic signals transmitted by global positioning system satellites. The received signal is transformed into a data signal indicative of the location (e.g., latitude and longitude) of the satellite antennas 210, 230 or an object positioned near the satellite antennas 210, 230, by the processors 202, 222.

The vehicle system 200 and the mobile device system 220 may include network interface hardware 212, 234 for communicatively coupling the mobile device system 220 and the vehicle system 200 with the server 114, e.g., via communication network 110. The network interface hardware 212, 234 is coupled to the communication paths 204, 224 such that the communication path 204 communicatively couples the network interface hardware 212, 234 to other modules of the mobile device system 220 and the vehicle system 200. The network interface hardware 212, 234 may be any device capable of transmitting and/or receiving data via a wireless network, e.g., the communication network 110. Accordingly, the network interface hardware 212, 234 may include a communication transceiver for sending and/or receiving data according to any wireless communication standard. For example, the network interface hardware 212, 234 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 212, 234 includes a Bluetooth® transceiver that enables the mobile device system 220 and the vehicle system 200 to exchange information with the server 114 via Bluetooth®.

The network interface hardware 212, 234 may utilize various communication protocols to establish a connection between multiple mobile device and/or vehicles. For example, in embodiments, the network interface hardware 212, 234 may utilize a communication protocol that enables communication between a vehicle and various other devices, e.g., vehicle-to-everything (V2X). Additionally, in other embodiments, the network interface hardware 212, 234 may utilize a communication protocol that is dedicated for short range communications (DSRC). Compatibility with other comparable communication protocols are also contemplated.

It is noted that communication protocols include multiple layers as defined by the Open Systems Interconnection Model (OSI model), which defines a telecommunication protocol as having multiple layers, e.g., Application layer, Presentation layer, Session layer, Transport layer, Network layer, Data link layer, and Physical layer. To function correctly, each communication protocol includes a top layer protocol and one or more bottom layer protocols. Examples of top layer protocols (e.g., application layer protocols) include HTTP, HTTP2 (SPDY), and HTTP3 (QUIC), which are appropriate for transmitting and exchanging data in general formats. Application layer protocols such as RTP and RTCP may be appropriate for various real time communications such as, e.g., telephony and messaging. Additionally, SSH and SFTP may be appropriate for secure maintenance, MQTT and AMQP may be appropriate for status notification and wakeup trigger, and MPEG-DASH/HLS may be appropriate for live video streaming with user-end systems. Examples of transport layer protocols that are selected by the various application layer protocols listed above include, e.g., TCP, QUIC/SPDY, SCTP, DCCP, VIP, and RUDP.

The vehicle system 200 and the mobile device system 220 include cameras 214, 232. The cameras 214, 232 may have any resolution. In some embodiments, one or more optical components, such as a mirror, fish-eye lens, or any other type of lens may be optically coupled to the cameras 214, 232. In embodiments, the camera may have a broad angle feature that enables capturing digital content within a 150 degree to 180 degree arc range. Alternatively, the cameras 214, 232 may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth.

In embodiments, the vehicle system 200 may include a display 216 for providing visual output. The display 216 may output images and/or a live video stream of various types of data. The display 216 is coupled to the communication path 204. Accordingly, the communication path 204 communicatively couples the display 216 to other modules of the mobile device system 220 including, without limitation, the processor 202 and/or the one or more memory modules 206. The display 216 may display a list of functionalities accessible by a vehicle occupant.

Still referring to FIG. 2, the vehicle system 200 includes a speaker 218 for transforming data signals from the vehicle system 200 into mechanical vibrations, such as in order to output audible prompts or audible information from the vehicle system 200. The speaker 218 is coupled to the communication path 204 and communicatively coupled to the one or more processors 202. The speaker 218 may output audio informing a list of functionalities accessible by a vehicle occupant. Additionally, the speaker 218 may also output audio in the form of various types of content, e.g., radio.

Still referring to FIG. 2, the server 114 may be a cloud server with one or more processors, memory modules, network interface hardware, and a communication path that communicatively couples each of these components. It is noted that the server 114 may be a single server or a combination of servers communicatively coupled together.

Figure 3:
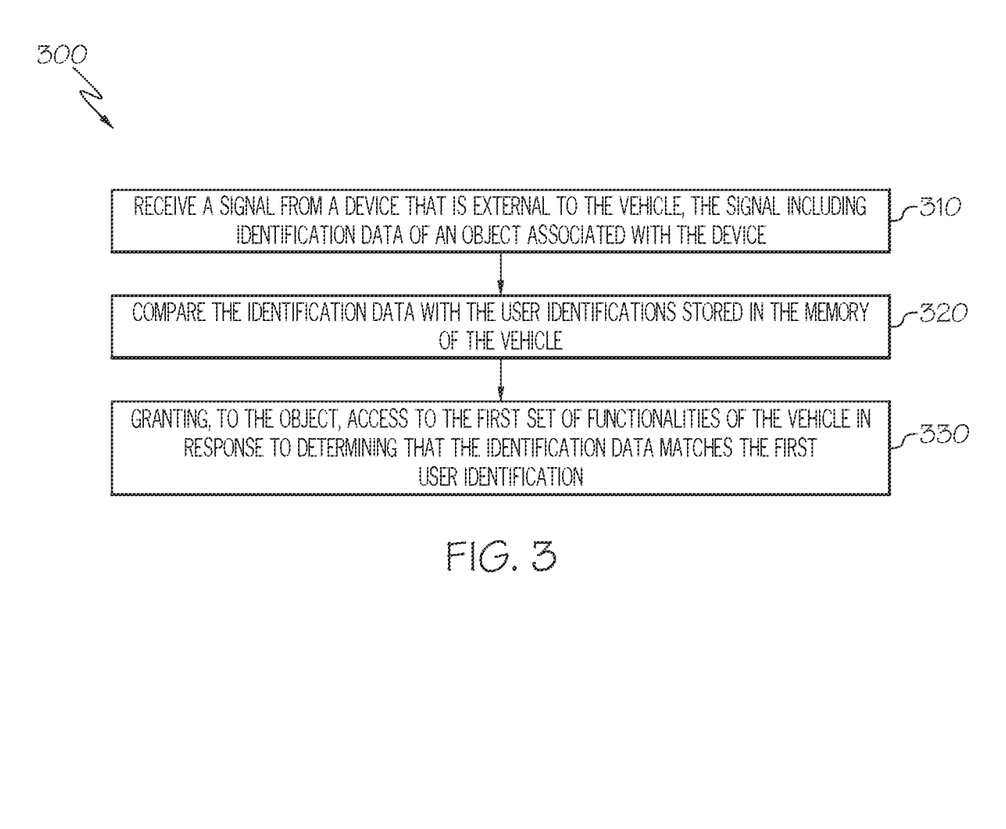
FIG. 3 depicts a flow chart for granting access to one or more functionalities of a vehicle, according to one or more embodiments described and illustrated herein.

FIG. 3 depicts a flow chart 300 for granting access to one or more functionalities of a vehicle, according to one or more embodiments described and illustrated herein. In embodiments, a user may want to access one or more functionalities of a vehicle parked at particular location, but may not be the owner of the vehicle. For example, a user may be an acquaintance of the owner of a vehicle and may want to temporarily access one or more functionalities of the vehicle. For example, in embodiments, the user may be a friend, family member, or acquaintance of the vehicle owner that has exited a venue (e.g., a sporting event) and would like to enter the vehicle and utilize the heat or air conditioning of the vehicle, seat warmers, radio, phone charger, and so forth. However, the user may not be authorized to access the vehicle, and as such, may not be able to enter the vehicle, which contributes to user inconvenience. The functionality access granting system described herein addresses such a user inconvenience.

In embodiments, the user, who may be carrying a smartphone that includes a Bluetooth® low energy transceiver. The smartphone may function as a Bluetooth® low energy beacon that is configured to transmit and receive data via a communication network, e.g., communication network 110. When the smartphone is within a certain proximity of the vehicle 100, the smartphone may transmit, automatically and without user intervention, a Bluetooth® signal to a transceiver of the vehicle (e.g., network interface hardware 212 of the vehicle system 200 included within the vehicle 100). It is noted that other devices may also serve as Bluetooth® low energy beacon, e.g., a key fob, a digital identification card, and so forth. It is also noted that, in embodiments, the device that servers as the Bluetooth® beacon may be manually instructed to transmit a Bluetooth® signal to one or more devices.

In embodiments, in block 310, a processor (e.g., the processor 202) of a vehicle (e.g., the vehicle 100) may receive the Bluetooth® signal from a device that is external to the vehicle (e.g., the smartphone or other such device associated with the user). The received Bluetooth® signal may include identification data of an object associated with the device. In embodiments, the object may be a user that is associated with the vehicle owner, e.g., a friend, employee/ employee, acquaintance, relative, and/or the like. The identification data may include, e.g., name, aliases, phone numbers, fax numbers, residential and business addresses, and the like, of a particular user. Additionally, in some embodiments, the identification data may also include one or more functionalities of the vehicle that may be designated as being accessible for the user, e.g., one or more of seat movement, air conditioning control, audio component operation, vehicle radio, and the ability to start and drive the vehicle.

In embodiments, in block 320, a processor of the vehicle may compare the identification data with user identifications stored in the memory of the vehicle. In embodiments, upon receiving the Bluetooth® signal from the device that is external to the vehicle, the processor of the vehicle may analyze the identification data included within the vehicle. In embodiments, the user identifications stored in the memory of the vehicle may include identification data related to a variety of users, each of whom may be linked to or designated as having access to certain vehicle functionalities. For example, the memory of the vehicle may store a table with a list of users each of whom may have corresponding identification data. For example, a first user may have a first user identification and a second user may have a second user identification such as, e.g., first and last name, aliases, phone numbers, fax numbers, residential and business addresses, and the like. The processor may compare the identified data included in the Bluetooth® signal with each of the user identifications stored in memory of the vehicle 100 in order to determine whether the identification data matches one or more of the user identifications stored in the memory of the vehicle.

In embodiments, in block 330, the processor may grant, to the object (e.g., a user), access to the first set of functionalities in response to determining that the identification data matches the first user identification. In embodiments, the processor may, upon performing the analysis described above, determine that the identification data of the object included in the signal matches one or more user identifications stored in the memory of the vehicle. In other words, the processor may determine that identification data of the object belongs to a user whose user identification is stored in memory of the vehicle. Upon completion of such a determination, the processor may identify a set of one or more vehicle functionalities (e.g., a first set of functionalities) of the vehicle to which the object (e.g., a first user) has access.

Thereafter, in embodiments, the processor may automatically unlock one or more doors of the vehicle and enable the user (e.g., the object) whose identification data matches the first user identification (one of the user identifications stored in memory of the vehicle) and allow this user to enter the vehicle. Additionally, based on the vehicle functionalities designated to this user, the user may be able to operate a specific set of vehicle functionalities. For example, after entering the vehicle, the user may be able to turn on the seat warmers, air conditioning, radio, and so forth. It is further noted that another user may be granted access, based on the above performed steps, to a different set of vehicle functionalities. In this way, the system described above may grant access to varying sets of vehicle functionalities to different users based on analyzing and comparing user identification data with user identifications stored in the memory of the vehicle.

Figure 4:
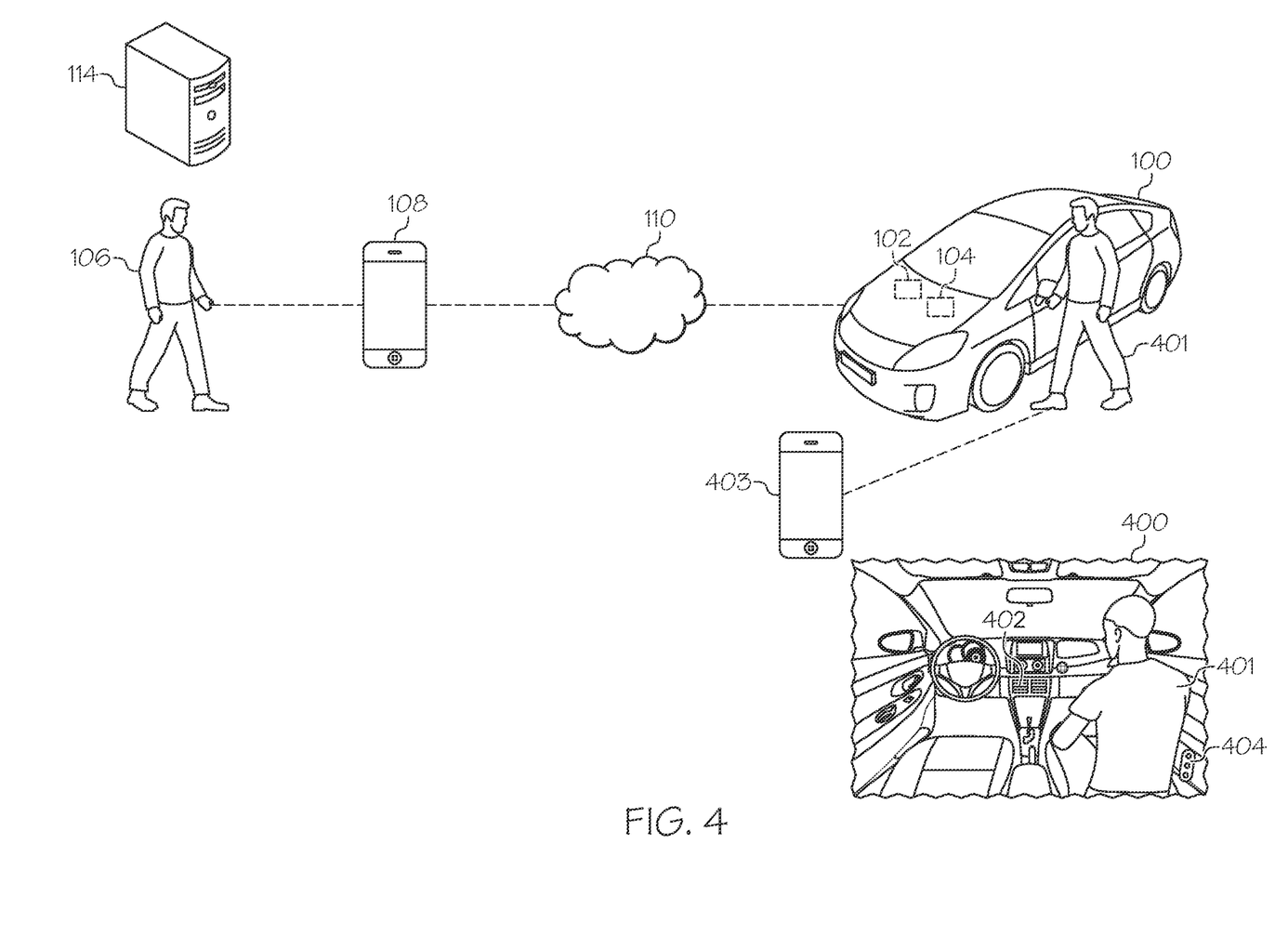
FIG. 4 schematically depicts an example operation in which the system of the present disclosure grants, to a first user, access to a first set of vehicle functionalities, according to one or more embodiments described and illustrated herein.

FIG. 4 schematically an example operation in which the system of the present disclosure grants, to a first user, access to a first set of vehicle functionalities, according to one or more embodiments described and illustrated herein.

For example, an example user 401 may be an elderly individual that exits a venue, e.g., a clinic or hospital, and walks towards the vehicle 100. The elderly individual may be a friend or relative of the vehicle owner 106 and may want enter the vehicle 100 in order to, e.g., escape the difficult weather conditions outside the vehicle 100. It is noted that the example user 401 (e.g., a first user) may carry an example smartphone 403 that serves as a Bluetooth® low energy beacon having a Bluetooth® low energy transceiver. Upon the example smartphone 403 being within a certain proximity of the vehicle 100 (e.g., 2 feet, 3 feet, or the like), the Bluetooth® low energy transceiver may transmit a Bluetooth® signal that is received by the network interface hardware 212 of the vehicle 100. Thereafter, the network interface hardware 212 may transfer the received signal, via the communication path 204, the processor 202 for analysis.

In embodiments, the processor 202 may utilize various digital data extraction and collation techniques to analyze the identification data included in the signal. For example, the processor 202 may extract identification data of the example user 401 such as name, age, address, status (e.g., relative), and so forth, from the signal. Other such data may also be extracted. It is noted that a variety of digital data and image recognition and machine learning techniques may be utilized to extract data related the example user 401. Additionally, the extracted identification data may be compared with a variety of user identifications. For example, the extracted identification data of the example user 401 may be compared to a list of user identifications stored in the one or more memory modules 206 of the vehicle system 200 installed as part of the vehicle 100. The list of user identifications may be included as part of a table that includes, e.g., a first user identification, a second user identification, a third user identification, and so forth. The first, second, and third user identifications may be listed and organized alphabetically, based on extent of detail, size, and so forth. Additionally, each of the first, second, and third user identifications may be designated or matched to a specific set of vehicle functionalities, e.g., a first set of functionalities, a second set of functionalities, a third set of functionalities, and so forth. In other words, the various users associated with the first, second, and third user identifications may each have access to a specific set of vehicle functionalities.

Still referring to FIG. 4, the processor 202 may complete the comparison of the extracted identification data of the example user 401 with the list of user identifications stored in the one or more memory modules 206 and determine that identification data of the example user 401 matches the first user identification. Consequently, the processors 202 may automatically unlock the passenger side vehicle door (among other doors) of the vehicle 100, and enable the example user 401 to enter the vehicle 100, e.g., and have a seat in the front or back passenger seats. Additionally, the processor 202 may transmit, via the network interface hardware 212, a message in the form of a notification to the mobile device 108 (e.g., a smartphone) of the vehicle owner 106 of the vehicle 100, upon the doors of the vehicle 100 being automatically unlocked. In some embodiments, a notification may be transmitted to the mobile device 108 when the smartphone 403 of the example user 401 is within a certain distance of the vehicle 100.

Thereafter, the processor 202 may grant access, to the example user 401, to all of the first set of functionalities that are stored in association with the first user identification. For example, as illustrated in FIG. 4, the first set of functionalities may include access to air conditioning and the seat warmers. In embodiments, the example user 401 may be able to control the temperature in the interior of the vehicle 100 such that hot or cold air may automatically exit from the air vents 402 of the vehicle 100. The example user 401 may not access certain functionalities, such as turning on the vehicle, adjusting side mirrors, etc. In embodiments, depending on the first set functionalities saved in the one or more memory modules 206, the processor 202 may automatically set the temperature within the vehicle based on the preference of the example user 401. In this way, the example user 401 (who may be an elderly individual) may not be required to know how to operate the specific systems of the vehicles (e.g., air conditioning control system 102, the component temperature control system 104, and so forth), especially at a time when the elderly individual is attempting escape the harsh climatic conditions outside the vehicle 100, e.g., severe snowstorm, heavy rain, extremely warm climate, and so forth. Other variations on the operation of the air conditioning system are also contemplated.

Additionally, in accordance with the first set of functionalities, the example user 501 may also be granted access to the seat warmers of the vehicle 100. For example, these seat warmers may be activated such that the seat on which the example user 401 sits is heated to a particular temperature, automatically and without user intervention. The example user 401 has full access to adjust the temperate of the seat such that the temperature of the seat may be reduced or increased as per the preferences of the example user 401, e.g., by interacting with seat temperature controls 404.

Figure 5:
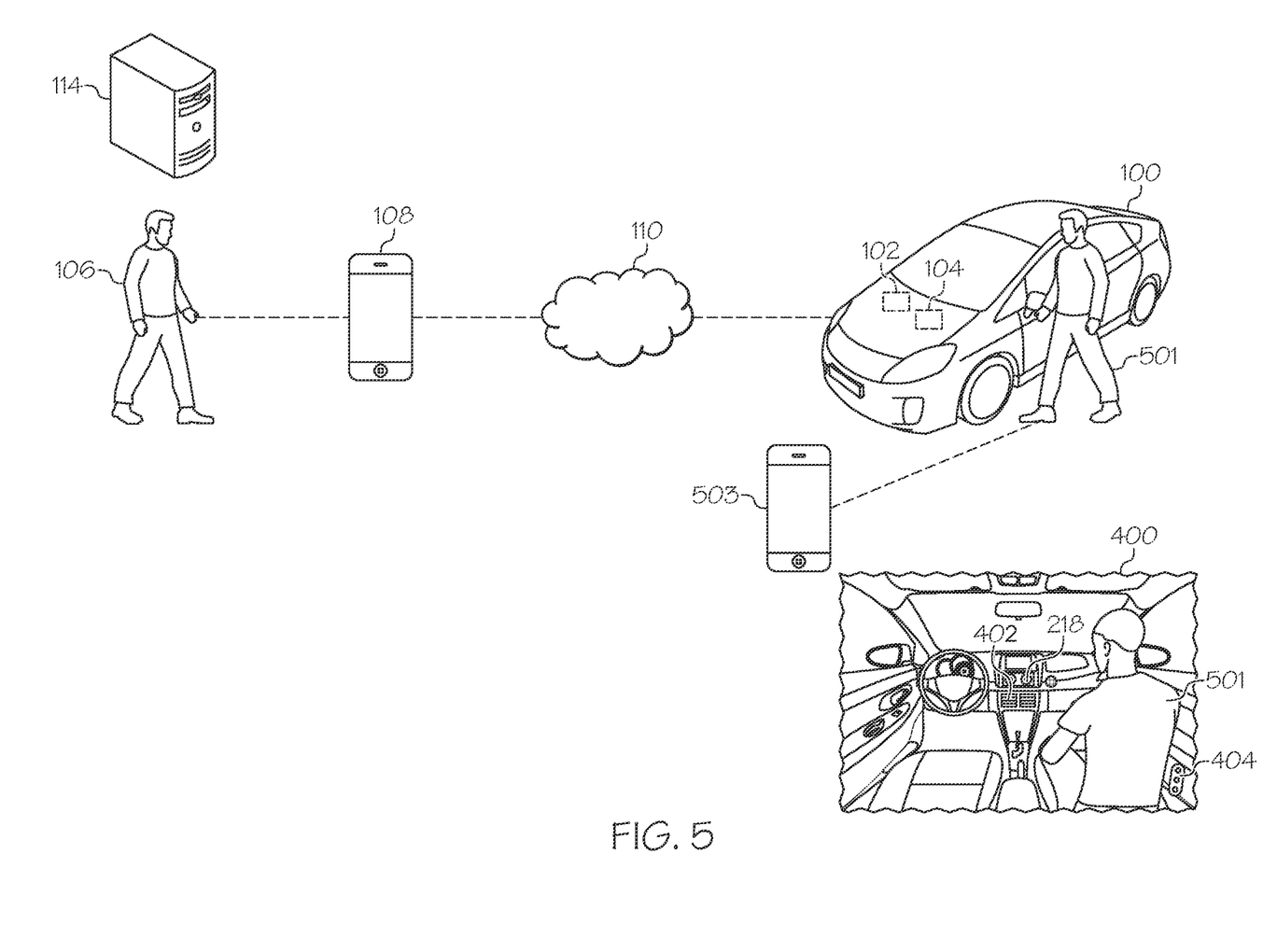
FIG. 5 schematically an example operation in which the system of the present disclosure grants, to a second user, access to a second set of vehicle functionalities, according to one or more embodiments described and illustrated herein.

FIG. 5 schematically an example operation in which the system of the present disclosure grants, to a second user, access to a second set of vehicle functionalities, according to one or more embodiments described and illustrated herein.

In embodiments, an example user 501 may be a young individual that exits a venue, e.g., at which a sporting event was recently held, and walks towards the vehicle 100. The young individual may be a friend or relative of the vehicle owner 106 and may want enter the vehicle 100 in order to, e.g., escape the difficult weather conditions outside the vehicle 100. The example user 501 may carry an example smartphone 503 (an additional device that is different from the example smartphone 403) that serves as a Bluetooth® low energy beacon having a Bluetooth® low energy transceiver, which may automatically transmit a Bluetooth® signal (e.g., an additional signal having identification data that is different from the Bluetooth® Signal in FIG. 4) when the smartphone 503 is within a certain proximity of the vehicle 100. The transmitted Bluetooth® signal is received by the network interface hardware 212, and then transferred to the processor 202 (via the communication path 204), for analysis.

As stated above, the processor 202 may utilize various digital data extraction and collation techniques to analyze identification data (e.g., additional identification data that is different from the identification data as described in FIG. 4) included in the received Bluetooth® signal. Specifically, the processor 202 may extract identification data of the example user 501 such as name, age, address, status (e.g., relative), and so forth, and compare the extracted data with a variety of user identifications (e.g., a first user identification, a second user identification, a third user identification, and so forth) stored in the memory modules 206 of the vehicle system 200. For example, the processor 202 may determine that the identification data of the example user 501 matches the second user identification. Thereafter, the processor 202 may automatically unlock the passenger side vehicle door (among other doors) of the vehicle 100, and enable the example user 501 to enter the vehicle 100, e.g., and have a seat in the front or back passenger seats.

Additionally, as in the example operation described in FIG. 4, the processor 202 may transmit, via the network interface hardware 212, a message in the form of a notification to the mobile device 108 (e.g., a smartphone) of the vehicle owner 106 of the vehicle 100, upon the doors of the vehicle 100 being automatically unlocked. Additionally or alternatively, in some embodiments, a notification may be transmitted to the mobile device 108 when the smartphone 503 is within a certain distance of the vehicle 100. The notification may include identification of a user entered the vehicle.

Thereafter, the processor 202 may grant access, to the example user 501 (e.g., an additional object that is different from the object (example user 401) in FIG. 4), to all of the second set of functionalities that are stored in association with the second user identification. For example, as illustrated, the second set of functionalities may include access to air conditioning, the seat warmers, and the stereo of the vehicle 100. In embodiments, the example user 501 may be able to control the temperature in the interior of the vehicle 100 such that hot or cold air may automatically exit from the air vents 402 of the vehicle 100. In some embodiments, the processor 202 may automatically set the temperature within the vehicle based on the preference of the example user 501. In this way, the example user 501 (who may be a young individual) may not be required to know how to operate the specific digital systems of the vehicles (e.g., the vehicle 100), especially at a time when the elderly individual is attempting escape the harsh climatic conditions outside the vehicle 100, e.g., severe snowstorm, heavy rain, extremely warm climate, and so forth. Other variations on the operation of the air conditioning system are also contemplated.

In accordance with the second set of functionalities, the example user 501 may also be granted access to the seat warmers of the vehicle 100. For example, these seat warmers may be activated such that the seat on which the example user 501 sits is heated to a particular temperature, automatically and without user intervention. The example user 501 has full access to adjust the temperature of the seat such that the temperature of the seat may be reduced or increased as per the preferences of the example user 501 by interacting with seat temperature controls 404. In addition, in accordance with the second set of functionalities, the example user 501 may also be granted access to the radio and audio system of the vehicle 100, via which sound may be output from the speaker 218 of the vehicle.

It should be understood that the embodiments described herein relate to a method for generating and outputting composite images on displays of vehicles. The method includes receiving a signal from a device that is external to the vehicle, the signal including identification data of an object associated with the device, comparing the identification data with the user identifications stored in the memory of the vehicle, and granting, to the object, access to the first set of functionalities of the vehicle in response to determining that the identification data matches the first user identification.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
memory storing user identifications including a first user identification and a second user identification, the first user identification being associated with a first set of functionalities and the second user identification being associated with a second set of functionalities;
a processor that is configured to:
determine whether a device that is external to the vehicle, is within a certain proximity of the vehicle;
receive a signal from the device, the signal including identification data of an object associated with the device, the signal is a Bluetooth signal, the signal automatically transmitted from the device to the vehicle in response to determining that the device is within the certain proximity of the vehicle;
compare the identification data with at least the first user identification and the second user identification stored in the memory;
grant, to the object, access to the first set of functionalities of the vehicle in response to determining that the identification data matches the first user identification, wherein the processor is configured to transmit a notification to a mobile device of an owner of the vehicle upon the granting of the access to the first set of functionalities to the object and a door of the vehicle being automatically unlocked, the notification including identification of the object to whom the access is granted; and
adjust a setting of a vehicle component based on the first set of functionalities.

2. The vehicle of claim 1, wherein the object is a first user and the device that is external to the vehicle is associated with the first user.

3. The vehicle of claim 1, wherein the device is a Bluetooth low energy beacon.

4. The vehicle of claim 1, wherein the device includes a Bluetooth low energy transceiver.

5. The vehicle of claim 1, wherein the processor is further configured to:
receive an additional signal from an additional device that is associated with an additional object, the additional signal including additional identification data associated with the additional object;

compare the additional identification data with at least the first user identification and the second user identification stored in the memory; and grant, to the additional object, the access to the second set of functionalities in response to determining that the additional identification data matches the second user identification.

6. The vehicle of claim 5, wherein the object is a first user and the additional object is a second user.

7. The vehicle of claim 5, wherein the processor is configured to transmit a notification to an owner of the vehicle upon the granting of the access to the second set of functionalities of the vehicle to the additional object.

8. The vehicle of claim 1, wherein the first set of functionalities includes one or more of seat movement, air conditioning control, audio component operation, and the second set of functionalities is different from the first set of functionalities.

9. The vehicle of claim 1, wherein the processor is configured to:
receive a request for accessing additional functionality from the object;
transmit the request to an owner of the vehicle;
grant access to the additional functionality in response to receive an authorization; and
update the first set of functionalities to include the additional functionality.

10. A method implemented by a processor of a vehicle, the method comprising:
determining whether a device that is external to the vehicle, is within a certain proximity of the vehicle;
receiving a signal from the device, the signal including identification data of an object associated with the device, the signal is a Bluetooth signal, the signal automatically transmitted from the device to the vehicle in response to determining that the device is within the certain proximity of the vehicle;
comparing the identification data with user identifications stored in a memory of the vehicle, the user identifications including a first user identification and a second user identification, the first user identification being associated with a first set of functionalities and the second user identification being associated with a second set of functionalities;
granting, to the object, access to the first set of functionalities of the vehicle in response to determining that the identification data matches the first user identification of the user identifications stored in the memory of the vehicle, wherein the processor is configured to transmit a notification to a mobile device of an owner of the vehicle upon the granting of the access to the first set of functionalities to the object and a door of the vehicle being automatically unlocked, the notification including identification of the object to whom the access is granted; and
adjusting a setting of a vehicle component based on the first set of functionalities.

11. The method of claim 10, wherein the object is a user and the device that is external to the vehicle is associated with the user.

12. The method of claim 10, further comprising:
receiving a request for accessing additional functionality from the object;
transmitting the request to an owner of the vehicle;
granting access to the additional functionality in response to receive an authorization; and
updating the first set of functionalities to include the additional functionality.

13. The method of claim 10, further comprising:
receiving an additional signal from an additional device that is associated with an additional object, the additional signal including additional identification data associated with the additional object;
comparing the additional identification data with the user identifications stored in the memory of the vehicle; and
granting, to the additional object, the access to the second set of functionalities in response to determining that the additional identification data matches the second user identification of the user identifications stored in the memory of the vehicle.

14. The method of claim 13, wherein the object is a first user and the additional object is a second user.

15. The method of claim 13, further comprising transmitting a notification to an owner of the vehicle upon the granting of the access to the second set of functionalities of the vehicle to the additional object.

16. The method of claim 10, further comprising detecting the device that is external to the vehicle when the device is within a certain proximity of the vehicle.

17. The method of claim 10, wherein the first set of functionalities includes one or more of seat movement, air conditioning control, audio component operation, and the second set of functionalities is different from the first set of functionalities.

18. The method of claim 10, wherein the device includes a Bluetooth low energy transceiver.

19. The vehicle of claim 1, wherein the identification data of the object is stored in memory of the vehicle and the object is a user separate from the owner of the vehicle.

20. The vehicle claim 1, wherein granting access to the first set of functionalities of the vehicle includes unlocking only passenger side vehicle doors among doors of the vehicle.

* * * * *